United States Patent
Rouquette et al.

(10) Patent No.: US 7,334,939 B2
(45) Date of Patent: Feb. 26, 2008

(54) METHOD AND DEVICE FOR VERIFYING A TEMPERATURE VALUE AT A DESTINATION ALTITUDE OF AN AIRCRAFT

(75) Inventors: Patrice Rouquette, Sebazac (FR); Vincent Markiton, Seysses (FR)

(73) Assignee: Airbus France, Toulouse (FR)

(*) Notice: Subject to any disclaimer, the term of this patent is extended or adjusted under 35 U.S.C. 154(b) by 75 days.

(21) Appl. No.: 11/046,682

(22) Filed: Feb. 1, 2005

(65) Prior Publication Data
US 2006/0056482 A1  Mar. 16, 2006

(30) Foreign Application Priority Data
Feb. 5, 2004  (FR) .................. 04 01102

(51) Int. Cl.
G01K 3/00  (2006.01)
G05D 1/04  (2006.01)
G06F 17/00  (2006.01)

(52) U.S. Cl. .............. 374/141; 374/1; 374/109; 701/4; 701/9

(58) Field of Classification Search ........... 374/141, 374/1, 142, 143
See application file for complete search history.

(56) References Cited

U.S. PATENT DOCUMENTS

| | | | | |
|---|---|---|---|---|
| 2,394,563 | A * | 2/1946 | Purcell ................ | 235/84 |
| 2,640,550 | A * | 6/1953 | Knapp et al. ........... | 416/35 |
| 3,005,607 | A * | 10/1961 | Antonio ............... | 244/117 A |
| 3,212,332 | A * | 10/1965 | Pappas ................ | 374/101 |
| 3,264,876 | A * | 8/1966 | Ten Bosch et al. ...... | 73/386 |
| 3,517,900 | A * | 6/1970 | Roussel ............... | 340/962 |
| 3,616,691 | A * | 11/1971 | Brandau ............... | 73/178 H |
| 4,152,938 | A * | 5/1979 | Danninger ............. | 374/138 |
| 4,212,064 | A * | 7/1980 | Forsythe et al. ....... | 701/29 |
| 4,263,804 | A * | 4/1981 | Seemann ............... | 73/30.01 |
| 4,318,076 | A * | 3/1982 | Whitfield ............. | 340/947 |
| 4,319,487 | A * | 3/1982 | Haase et al. .......... | 73/384 |
| 5,001,638 | A * | 3/1991 | Zimmerman et al. ...... | 701/14 |
| 5,020,747 | A * | 6/1991 | Orgun et al. .......... | 244/187 |
| 5,070,458 | A * | 12/1991 | Gilmore et al. ........ | 701/14 |
| 5,100,080 | A * | 3/1992 | Servanty .............. | 244/9 |
| 5,398,547 | A * | 3/1995 | Gerardi et al. ........ | 73/170.26 |
| 5,416,728 | A * | 5/1995 | Rudzewicz et al. ...... | 702/130 |

(Continued)

FOREIGN PATENT DOCUMENTS

GB  2169572  7/1986

(Continued)

OTHER PUBLICATIONS

Preliminary Search Report dated Sep. 29, 2004.

*Primary Examiner*—Gail Verbitsky
(74) *Attorney, Agent, or Firm*—Stevens, Davis, Miller & Mosher, LLP

(57) ABSTRACT

The device comprises a means for measuring a dynamic temperature on the outside of the aircraft, a means for determining a static temperature around the aircraft, using said dynamic temperature, a means for determining, using said static temperature and a thermodynamic equation, a second temperature value corresponding to an estimated temperature at said destination altitude, a means for determining the difference between said first and second temperature values, and a means for emitting a warning signal when said difference is greater than a predetermined value.

11 Claims, 1 Drawing Sheet

U.S. PATENT DOCUMENTS

| | | | | |
|---|---|---|---|---|
| 5,481,220 | A * | 1/1996 | Mildren | 327/512 |
| 5,610,845 | A * | 3/1997 | Slabinski et al. | 702/144 |
| 5,653,538 | A * | 8/1997 | Phillips | 374/138 |
| 5,796,612 | A * | 8/1998 | Palmer | 701/4 |
| 6,148,188 | A * | 11/2000 | Sullivan | 455/226.1 |
| 6,209,821 | B1 * | 4/2001 | Gary | 244/53 B |
| 6,216,064 | B1 * | 4/2001 | Johnson et al. | 701/4 |
| 6,250,149 | B1 * | 6/2001 | Black | 73/178 R |
| 6,263,263 | B1 * | 7/2001 | Shehi et al. | 701/3 |
| 6,266,583 | B1 * | 7/2001 | Tazartes et al. | 701/4 |
| 6,370,450 | B1 * | 4/2002 | Kromer et al. | 701/14 |
| 6,622,556 | B1 * | 9/2003 | May | 73/202.5 |
| 6,697,069 | B2 * | 2/2004 | Yuzuki | 345/440 |
| 6,837,225 | B1 * | 1/2005 | Fukuda | 123/552 |
| 7,009,553 | B1 * | 3/2006 | Billings | 342/120 |
| 7,014,357 | B2 * | 3/2006 | Severson | 374/16 |
| 7,014,359 | B2 * | 3/2006 | Suga | 374/208 |
| 7,031,871 | B2 * | 4/2006 | Severson et al. | 702/130 |
| 2003/0136191 | A1 * | 7/2003 | Tsuji | 73/384 |
| 2003/0229427 | A1 * | 12/2003 | Chapman et al. | 701/3 |
| 2004/0267414 | A1 * | 12/2004 | Bartel | 701/4 |
| 2005/0039516 | A1 * | 2/2005 | Fleming | 73/23.2 |
| 2005/0043865 | A1 * | 2/2005 | Seve | 701/7 |
| 2005/0288895 | A1 * | 12/2005 | Petit | 702/182 |
| 2006/0106559 | A1 * | 5/2006 | Lerch | 702/94 |

FOREIGN PATENT DOCUMENTS

| | | |
|---|---|---|
| GB | 2179613 | 3/1987 |

* cited by examiner

METHOD AND DEVICE FOR VERIFYING A TEMPERATURE VALUE AT A DESTINATION ALTITUDE OF AN AIRCRAFT

BACKGROUND OF THE INVENTION

The present invention relates to a method and to a device for verifying a temperature value corresponding to the temperature at a destination altitude of an aircraft, and to a flight management system that includes such a device.

DESCRIPTION OF THE PRIOR ART

It is known that a flight management system or FMS comprises, in particular:
- means allowing an operator, in particular the pilot of the aircraft, to enter at least one temperature value, and especially the value of the temperature at the envisaged destination of the aircraft, which is supplied to him via the control tower of the destination airport; and
- a central processing unit that can correct at least one altitude value, taking into account the input temperature value. The altitude thus corrected may especially be used to calculate the effective vertical deviation of the aircraft from a prescribed flight path.

In such a case, an error by the pilot in inputting the destination temperature results in an error in the calculation (or correction) of the aircraft's altitude and thus its vertical deviation from the prescribed flight path, which may of course have very serious consequences, especially when the aircraft is flying at low altitude.

The object of the present invention is to remedy the input error by a pilot resulting in erroneous vertical guiding of an aircraft. It relates to a method for verifying a first temperature value input by a pilot and corresponding to the temperature at a destination altitude of an aircraft.

SUMMARY OF THE INVENTION

For this purpose, said method is noteworthy, according to the invention, in that:
a) a dynamic temperature on the outside of the aircraft, at the actual altitude of said aircraft, is measured;
b) a static temperature around the aircraft is determined using said dynamic temperature;
c) a second temperature value corresponding to an estimated temperature at said destination altitude is determined using said static temperature and a thermodynamic equation;
d) the difference between said first and second temperature values is determined; and
e) if said difference is greater than a predetermined value, for example 10° C., a warning signal is emitted.

Thus, the invention provides a method for rapidly and accurately verifying a temperature value, in particular a temperature at a destination altitude input into a flight management system by a pilot.

Advantageously, in step b), said static temperature $T_{r1}$ is determined using the following equation:

$$T_{r1}=T_r/[1+(0.2K_rM^2)]$$

in which:
- $T_r$ represents the measured dynamic temperature;
- $K_r$ represents a coefficient; and
- M represents the Mach number.

Furthermore, advantageously, in step c), said second temperature value $T_{r2}$ is determined using the following thermodynamic equation:

$$T_{r2}=T_{std2}(T_{r1}/T_{std1})$$

in which:
- $T_{r1}$ represents said static temperature at the actual altitude of the aircraft;
- $T_{std1}$ represents the standard temperature at said actual altitude of the aircraft, that is to say at the altitude at which the dynamic temperature was measured (in step a); and
- $T_{std2}$ represents the standard temperature at the destination altitude.

In this case, advantageously:
said standard temperature $T_{std1}$ is determined using the following equation:

$$T_{std1}=288-(L_0H_1)$$

in which:
- $L_0$ is a coefficient; and
- $H_1$ is the actual altitude of the aircraft; and/or said standard temperature $T_{std2}$ is determined using the following equation:

$$T_{std2}=288-(L_0H_2)$$

in which:
- $L_0$ is a coefficient; and
- $H_2$ is said destination altitude.

The present invention also relates to a device for verifying a first temperature value corresponding to the temperature at a destination altitude of an aircraft.

According to the invention, said device is noteworthy in that it comprises:
- a means for measuring a dynamic temperature on the outside of the aircraft;
- a means for determining a static temperature around the aircraft using said dynamic temperature;
- a means for determining a second temperature value, corresponding to an estimated temperature at said destination altitude, using said static temperature and a thermodynamic equation;
- a means for determining the difference between said first and second temperature values; and
- a means for emitting a warning signal when said difference is greater than a predetermined value.

Moreover, the present invention also relates to a flight management system for an aircraft, of the type comprising at least:
- means allowing an operator to input at least one temperature value; and
- a central processing unit that corrects at least one altitude value, at least using an input temperature value.

According to the invention, said flight management system is noteworthy in that it also comprises a device such as that mentioned above and in that said device is automatically triggered when a temperature value is input by an operator, so as to verify this temperature value.

Thus, thanks to the invention, the temperature value input by an operator, in particular the pilot of the aircraft, is automatically verified as soon as the value is input. Effective and automatic monitoring of the temperature values input is therefore achieved.

BRIEF DESCRIPTION OF THE DRAWINGS

The figures of the appended drawing will make it clearly understood how the invention can be realized. In these figures, identical references denote similar elements.

DESCRIPTION OF THE PREFERRED EMBODIMENTS

Figure 1:
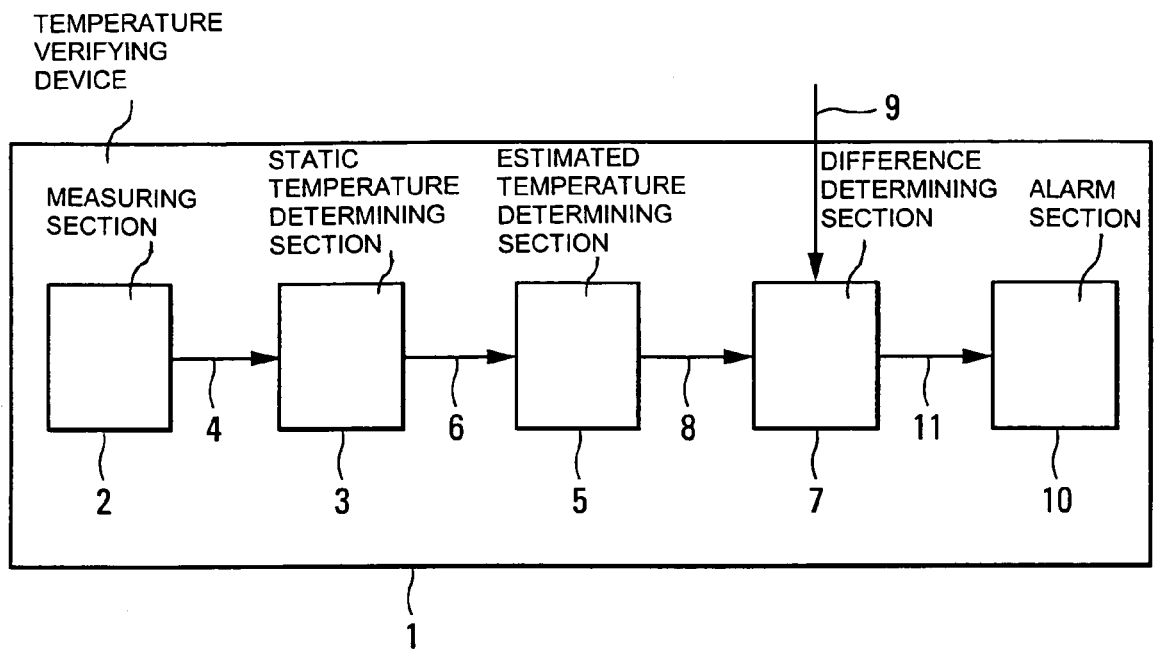
FIG. 1 is the block diagram of a device according to the invention.

The device 1 according to the invention, shown schematically in FIG. 1, is intended to verify a temperature value $T_1$ input by a pilot and corresponding to the temperature at a destination altitude of an aircraft.

According to the invention, said device 1 comprises:
- a usual means 2 for measuring the dynamic temperature on the outside of the aircraft, at the actual position and the actual altitude of said aircraft;
- a means 3 that is connected via a link 4 to said means 2, in order to determine the static temperature $T_{r1}$ around the aircraft (i.e. at the actual altitude of the aircraft), using the dynamic temperature received from said means 2;
- a means 5 for determining a temperature value $T_{r2}$, corresponding to an estimated temperature at said destination altitude, using said static temperature $T_{r1}$ received via a link 6 and an integrated thermodynamic equation, specified below;
- a means 7 that receives said temperature value $T_{r2}$ via a link 8 and said temperature value $T_1$, which value must be verified via a link 9, and that determines the difference between said temperature values $T_{r2}$ and $T_1$; and
- a means 10 that is connected via a link 11 to said means 7, for emitting an alarm signal when said difference is greater than a predetermined value, for example $X°$ C.

In addition, according to the invention, said means 3 determines said static temperature $T_{r1}$ using the following equation:

$$T_{r1}=T_r/[1+(0.2K_r M^2)]$$

in which:
- $T_r$ represents said dynamic temperature, expressed in ° C. and measured by a standard probe on the aircraft;
- $K_r$ represents a coefficient, namely a recovery coefficient for the probe, defined by the manufacturer of said probe; and
- M represents the Mach number of the aircraft.

Furthermore, said means 5 determines said temperature value $T_{r2}$ using the following thermodynamic equation:

$$T_{r2}=T_{std2}(T_{r1}/T_{std1})$$

in which:
- $T_{std1}$ represents the standard temperature at said actual altitude of the aircraft, i.e. at the altitude at which the means 2 has measured the dynamic temperature; and
- $T_{std2}$ represents the standard temperature at the destination altitude, i.e. at the altitude of the airport at which the aircraft intends to land.

To do this, said means 5 determines beforehand said standard temperature $T_{std1}$ using the following equation:

$$T_{std1}=288-(L_0 H_1)$$

in which:
- $L_0$ is a coefficient; and
- $H_1$ is the actual altitude of the aircraft.

When $T_{std1}$ is expressed in degrees Kelvin and $H_1$ in meters, the coefficient Lo may be equal to 0.00198°/foot (i.e. about 0.0065°/meter).

In addition, said means 5 determines said standard temperature $T_{std2}$ using the following equation:

$$T_{std2}=288-(L_0 H_2)$$

in which:
- $L_0$ is a coefficient; and
- $H_2$ is said destination altitude.

When $T_{std2}$ is expressed in degrees Kelvin and $H_2$ in meters, said coefficient $L_0$ may be equal to 0.00198°/foot (i.e. about 0.0065°/meter).

Moreover, said means 10 can emit, in a conventional manner, a visual warning signal and/or an audible warning signal.

Figure 2:
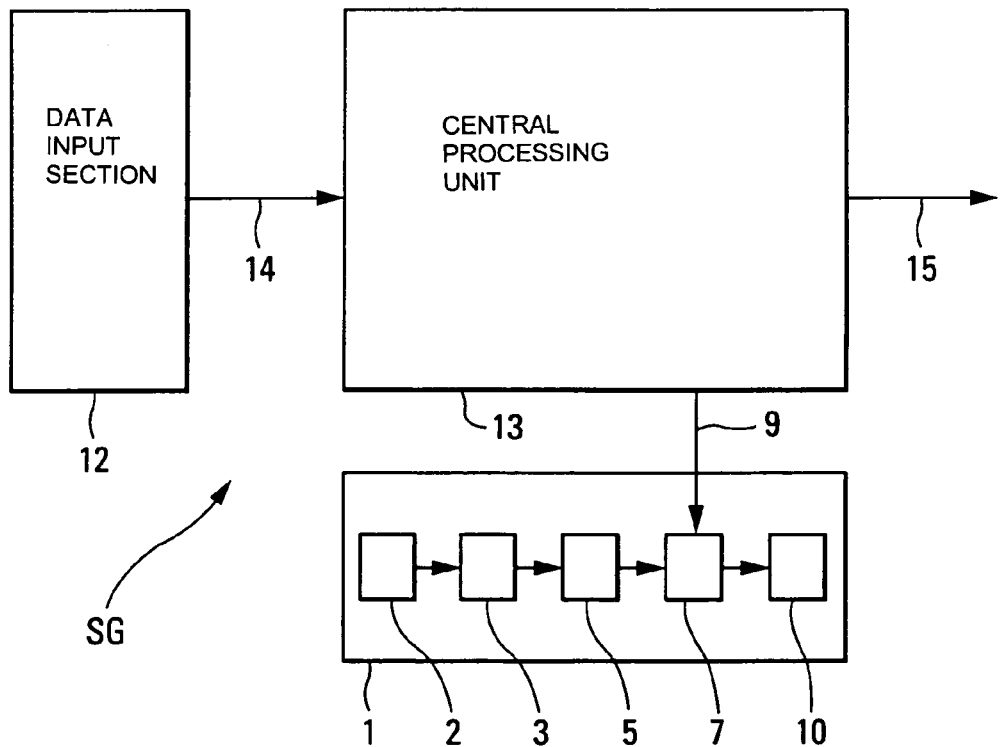
FIG. 2 is the block diagram of a flight management system of an aircraft, according to the invention and including a device such as the one shown in FIG. 1.

In a preferred application of the device 1 according to the invention, this may form part of a conventional flight management system SG which includes, as shown in FIG. 2, at least:
- means 12, for example a computer keyboard and/or a computer mouse, allowing an operator, in particular the pilot of the aircraft, to input data, and at least one temperature value; and
- a central processing unit 13 that is connected via a link 14 to said means 12 and allows particular parameters to be calculated, especially using data input by an operator using said means 12.

The central processing unit 13 can send the parameters thus calculated to a user device (not shown) via a link 15.

In particular, said central processing unit 13 is capable of correcting an aircraft altitude value using at least one temperature value input by the pilot, and especially the destination temperature. This destination temperature represents the temperature at the destination airport, which is supplied to the pilot by the control tower of this destination airport.

According to the invention, the device 1 therefore forms part of said flight management system SG and is set up so as to be automatically triggered when the pilot enters a temperature value into the central processing unit 13 using the means 12.

Thus, when the flight management system SG is used to correct the altitude of the aircraft using a destination temperature input by the pilot, this destination temperature is automatically verified by the device 1, and a warning signal is emitted if it is erroneous. In addition, only precise values (with a margin of error) of the destination temperature are used by the flight management system SG to correct the altitude of the aircraft in such a way that this corrected altitude is then always of sufficient precision. This is also true, as the case may be, for any vertical deviation of the aircraft from a prescribed flight path, which is conventionally calculated by the flight management system SG using the altitude value thus corrected.

The invention claimed is:

1. A method of verifying a first temperature value corresponding to the temperature at a destination altitude of an aircraft, comprising:

a) measuring a dynamic temperature on the outside of the aircraft, at the actual altitude of said aircraft;
b) determining a static temperature around the aircraft using said dynamic temperature;
c) determining a second temperature value corresponding to an estimated temperature at said destination altitude using said static temperature and a thermodynamic equation;
d) determining the difference between said first and second temperature values; and
e) if said difference is greater than a predetermined value, emitting a warning signal.

2. The method as claimed in claim 1, wherein, in step b), said static temperature $T_{r1}$ is determined using the following equation:

$$T_{r1}=T_r/[1+(0.2K_rM^2)]$$

in which:
$T_r$ represents the measured dynamic temperature;
$K_r$ represents a coefficient; and
M represents the Mach number.

3. The method as claimed in claim 1, wherein, in step c), said second temperature value $T_{r2}$ is determined using the following thermodynamic equation:

$$T_{r2}=T_{std2}(T_{r1}/T_{std1})$$

in which:
$T_{r1}$ represents said static temperature at the actual altitude of the aircraft;
$T_{std1}$ represents the standard temperature at said actual altitude of the aircraft; and
$T_{std2}$ represents the standard temperature at the destination altitude.

4. The method as claimed in claim 3, wherein said standard temperature $T_{std1}$ determined using the following equation:

$$T_{std1}=288-(L_0H_1)$$

in which:
$L_0$ is a coefficient; and
$H_1$ is the actual altitude of the aircraft.

5. The method as claimed in claim 3, wherein said standard temperature $T_{std2}$ as determined using the following equation:

$$T_{std2}=288-(L_0H_2)$$

in which:
$L_0$ is a coefficient; and
$H_2$ is said destination altitude.

6. The method as claimed in claim 1, wherein said predetermined value used in step e) is substantially equal to 10° C.

7. A device for verifying a first temperature value corresponding to the temperature at a destination altitude of an aircraft, which comprises:
a measuring section that measures a dynamic temperature on the outside of the aircraft;
a first determining section that determines a static temperature around the aircraft using said dynamic temperature;
a second determining section that determines a second temperature value, corresponding to an estimated temperature at said destination altitude, using said static temperature and a thermodynamic equation;
a difference determining section that determines the difference between said first and second temperature values; and
an emitting section that emits a warning signal when said difference is greater than a predetermined value.

8. A flight management system of an aircraft, comprising at least:
the device specified in claim 7;
an input section that allows an operator to input at least one temperature value; and
a central processing unit that corrects at least one altitude value only if the device has verified that the at least one temperature value entered by the operator is precise, wherein:
said device is automatically triggered when a temperature value is input by an operator, so as to verify this temperature value.

9. An aircraft, which includes the system specified in claim 8.

10. An aircraft, which includes the device specified in claim 7.

11. An aircraft, which includes a device that implements the method specified in claim 1.

* * * * *